Inventor
Kenneth Ernest Buckman
BY G. E. Johnson
Attorney

United States Patent Office 3,361,260
Patented Jan. 2, 1968

3,361,260
FILTER UNIT HAVING CO-AXIAL FILTER ELEMENTS
Kenneth Ernest Buckman, Winsor, near Woodlands, Southhampton, England, assignor to General Motors Corporation, Detroit, Mich., a corporation of Delaware
Filed July 12, 1965, Ser. No. 471,049
Claims priority, application Great Britain, July 17, 1964, 29,250/64
3 Claims. (Cl. 210—130)

ABSTRACT OF THE DISCLOSURE

A filter unit in which a pair of filter elements are compactly arranged to give large surface contact with a liquid to be clarified.

---

Figure 1:
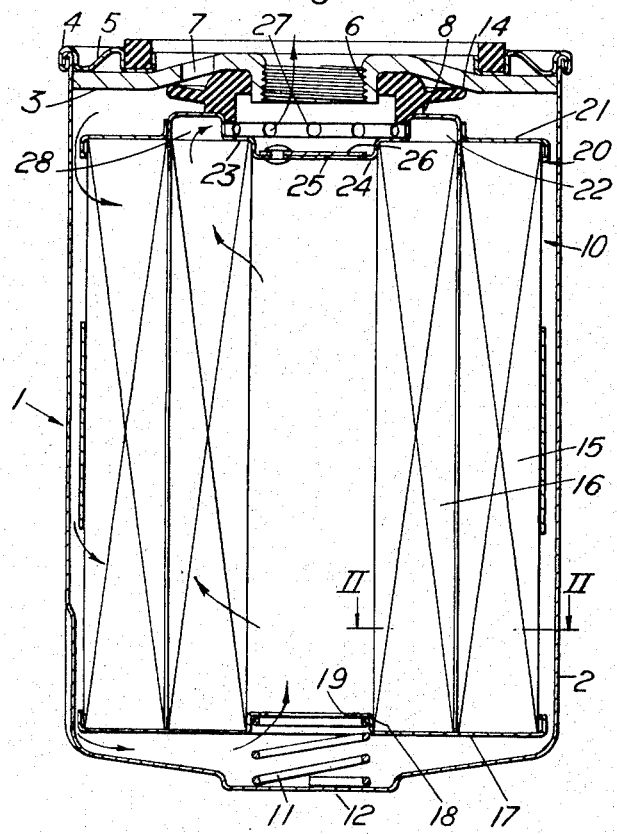

A liquid filter unit according to the invention comprises a pair of annular filter elements made of pleated synthetic resin-impregnated filter paper or like sheet filter material, the elements being mounted co-axially one within the other and the opposite ends of both elements being secured to end caps so that liquid to be filtered flows from the outside to the inside of the outer element and from the inside to the outside of the inner element towards outlet openings in one end cap. Said one end cap preferably incorporates a pressure relief valve to permit a by-pass flow of liquid to the outlet openings if the filter elements become blocked in use.

The filter elements are preferably secured at one end to an annular end cap the central opening in which permits the entry of liquid to the inside of the inner element; and at their other end the elements are secured to an end cap which is of stepped form so as to provide at this end of the element an annular space which is in communication with the inside of the outer element and the outside of the inner element, said stepped end cap having therein outlet openings which are in communication with said annular space. The stepped annular end cap preferably also has a central portion with an opening therein closed by a pressure relief valve, the latter conveniently being in the form of a spring disc a portion of which normally overlies and seals said opening but yields to permit flow therethrough when a predetermined pressure within the filter is reached in the event of the filter elements becoming blocked.

The annular filter elements are each made from a strip of synthetic resin-impregnated filter paper which is joined at its ends and folded about regularly spaced transverse fold lines to form a series of pleats the fold lines of which extend longitudinally of the annulus; the pleats preferably have spacer dimples or like formations impressed therein so that adjacent pleats are regularly spaced by the contact of the spacer formations on the adjacent pleats; and the two parts of each pleat are preferably formed with either spacer dimples or like spacer formation to provide passages within each pleat for the flow of filtered liquid.

The ends of the pleats of the inner element which are adjacent said stepped end plate should be individually sealed, as by adhesive applied to the apposed faces of the two end portions of each pleat, so as to permit an uninterrupted flow of liquid longitudinally of the element towards said annular space; but adjacent its inner periphery the end of the inner element may be secured by adhesive to an annular portion of the stepped end plate adjoining said annular space.

The ends of each pleat of the outer element may also be sealed separately from adjacent pleats by means of adhesive applied to the opposed end portions of the two halves of each pleat. Alternatively, or additionally the ends of the pleats of the outer element may be sealed by adhesive to the end caps.

Figure 2:
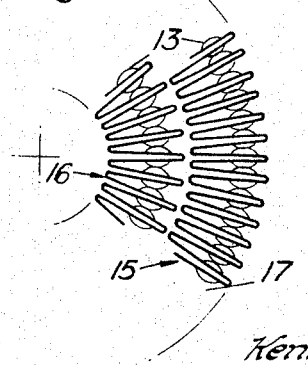

The scope of the invention is defined by the appended claims; and the invention and the method by which it is to be performed are hereinafter particularly described with reference to the accompanying drawings in which:

FIGURE 1 is a vertical section through a filter unit according to the invention; and FIGURE 2 is a section on the line II—II of FIGURE 1.

In one preferred embodiment of the invention the filter unit 1 comprises a thin sheet metal cup-shaped casing 2 secured at its rim to an annular support plate 3 by means of a rolled seam joint 4 with an annular sheet metal disc 5 which is welded to the support plate 3.

The support plate 3 has therein a central opening 6 having threads by which the casing 2 can be secured to a mount face (not shown) with the central opening 6, which constitutes the outlet from the filter unit 1, in communication with an inlet opening of the engine lubrication system, and further inlet openings 7 in said support plate 3 in communication with an outlet opening of the lubrication system. Each of the inlet openings 7 may be referred to as a "first inlet opening."

An annular gasket 8 mounted within the casing 2 coaxially with said central opening 6 is engaged with one end of a filter unit 10 within the casing 2, the other end of the unit 10 being pressed by a spring 11 the other end of which engages the base 12 of the casing 2 so as to press the filter unit 10 into sealed engagement with the gasket 8. The latter conveniently has an integral flange 14 which normally overlies the inlet openings 7 in the support plate 3 the flange 14 being capable of deflection by the pressure of oil delivered to the filter unit 10 to permit entry of the oil by way of said inlet openings 7.

The filter unit 10 comprises a pair of annular filter elements 15, 16 made of synthetic resin-impregnated filter paper folded to form a series of pleats in which the fold lines extend longitudinally of the annulus, the pleats being regularly spaced from each other by spacer dimples 13 impressed in the filter paper.

The filter elements are of the same length but of different diameters, one element 16 fitting within the other element 15.

At one end of the unit 10 one end of each element 15, 16 is secured by adhesive to an annular end plate 17 having therein a central depressed portion 18 which fits within the central opening of the inner element 16 and has therein an inlet opening 19. The opening 19 may be referred to as a "second inlet opening." The central depressed portion 18 forms a seat for the spring 11 by which the filter unit 10 is pressed into engagement with the gasket 8 at the other end of the unit.

At their other ends the two filter elements 15, 16 are secured to a further annular end plate 20 which is of stepped form, an outer annular portion 21 of this end plate being secured to the end of the outer filter element 15 and an inner portion of the further end plate 20 including a stepped portion 22 which is axially spaced from an outer peripheral portion of the end of the inner element 16 but includes a portion 23 which overlies and is secured by adhesive to an inner peripheral portion of the end of the inner filter element. The further end plate 20 also has a central recessed portion 24 which fits within the central opening at the end of the inner filter element 16, the recessed portion 24 having therein a valve opening 25 normally closed by a spring plate 26.

The inner axial wall of the stepped portion 22 has therein one or more of openings 27 which communicate with the annular space 28 between the walls of the stepped portion and the end of the inner element 16, said openings 27 providing communication between said annular space 28 and the outlet opening 6 in the support plate 3 of the casing 2.

The ends of the pleats of the inner element 16 are individually sealed, as by adhesive applied to the apposed faces of the two end portions of each pleat, so as to permit an uninterrupted flow of liquid longitudinally of the elements toward said annular space 22.

The ends of the pleats of the outer element 15 may also be individually sealed, if desired, as an alternative, or an addition to the sealing of the ends of the pleats to the portion 21 of the end cap 20.

In use, oil to be filtered enters the casing 2 by way of the inlet openings 7 in the support plate 3 and passes from the outside to the inside of the outer element 15 and also enters the opening 19 in the end cap 17 adjacent the base of the cup-shaped casing 2 and then passes from the inside to the downstream side of the pleats of the inner element 16, as shown by the arrows on FIGURE 1. Filtered liquid flows freely in the space between the inner surfaces of the pleats of the outer element 16, joining oil flowing freely between the outer surfaces of the pleats of the inner element 15, the combined flow passing longitudinally of the elements towards the annular space 22 between the stepped end plate 20 and the end of the inner element 16, by way of the spaces between and on the outside of the pleats of the inner element 16, and then from thence passes by way of the openings 27 in the axial wall of the step to the outlet opening 6 in the support plate 3.

In the event of the element 15, 16 becoming blocked by accumulated filtered solids the oil can flow direct through the central opening 19 in the end plate 17 and then by way of the valve 26 in the stepped end plate 20 direct to the outlet opening 6.

With the above-described arrangement there is a substantially greater surface area of filter paper available for filtration than would be possible with a single filter element of similar construction but with a greater radial depth of pleat. This is because the outer element 15 may have pleats as closely grouped as those in the inner element 16. Thus the element can have a longer life; or, alternatively a filter paper having finer porosity may be used to provide the same life as a single filter element with reduced surface area but greater porosity.

I claim:
1. A liquid filter unit comprising a thin walled casing in the form of a cup, a thick end wall closing said cup, a central opening in said end wall, a first inlet opening in said end wall, a pair of filter elements mounted co-axially one within the other, end caps secured to the opposite ends of said pair of elements, one of said end caps defining a second inlet opening leading to the interior of the inner filter element of said pair, means retaining said end caps and outer filter element of said pair in adequate spaced relation with the interior surfaces of said cup and end wall to maintain a flow passage from said first inlet opening to said second inlet opening, the other of said end caps being sealed to the end of the outer element and to an inner part of the end of the inner element and being spaced from an outer part of the end of the inner element to define an annular chamber and being so constructed that fluid flows from a zone between the elements of said pair through said annular chamber and through openings in the inner wall of said chamber to said central opening, sealing means interposed between said other end cap and an area of said thick end wall inward of said first inlet, additional sealing means on said thick end wall outward of first inlet and adapted sealingly to engage a support, and means for attaching said unit to said support.

2. A liquid filter unit as set forth in claim 1, each of said pair of elements being formed of resin-impregnated filter paper having pleats with fold lines extending from one of said end caps to the other, and said pleats substantially traversing the radial dimension of said zone to contribute large filtering surface areas.

3. A liquid filter unit as set forth in claim 1, said other end cap having a bypass opening therein leading to said central opening, and a pressure relief valve normally closing said bypass opening.

References Cited

UNITED STATES PATENTS

| 2,031,936 | 2/1936 | Cuno | 210—130 X |
| 2,747,744 | 5/1956 | Gretzinger | 210—315 X |
| 2,936,891 | 5/1960 | Kukowski et al. | 210—131 |
| 3,211,292 | 10/1965 | Bull | 210—342 |
| 3,232,437 | 2/1966 | Hultgren | 210—136 X |
| 3,258,122 | 6/1966 | Buckman et al. | 210—136 |

FOREIGN PATENTS

| 840,757 | 7/1960 | Great Britain. |
| 891,854 | 3/1962 | Great Britain. |

REUBEN FRIEDMAN, *Primary Examiner.*

SAMIH N. ZAHARNA, *Examiner.*

F. SPEAR, *Assistant Examiner.*